(12) United States Patent
Lee et al.

(10) Patent No.: US 9,678,347 B2
(45) Date of Patent: Jun. 13, 2017

(54) GLASSES-TYPE MOBILE TERMINAL

(71) Applicant: LG ELECTRONICS INC., Seoul (KR)

(72) Inventors: Haklim Lee, Seoul (KR); Wonseok Joo, Seoul (KR); Hanseok Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/718,931

(22) Filed: May 21, 2015

(65) Prior Publication Data
US 2015/0378160 A1 Dec. 31, 2015

(30) Foreign Application Priority Data

Jun. 30, 2014 (KR) ........................ 10-2014-0081166

(51) Int. Cl.
| | | |
|---|---|---|
| *G09G 5/00* | (2006.01) | |
| *G02B 27/01* | (2006.01) | |
| *G06F 3/01* | (2006.01) | |
| *G06K 9/00* | (2006.01) | |

(52) U.S. Cl.
CPC ..... *G02B 27/0172* (2013.01); *G02B 27/0176* (2013.01); *G06F 3/011* (2013.01); *G06K 9/00671* (2013.01); *G02B 2027/014* (2013.01); *G02B 2027/0138* (2013.01); *G02B 2027/0141* (2013.01); *G02B 2027/0178* (2013.01); *G02B 2027/0187* (2013.01)

(58) Field of Classification Search
CPC .... G02B 27/0176; G02B 27/017; G06F 1/163
See application file for complete search history.

(56) References Cited

U.S. PATENT DOCUMENTS

| | | | | |
|---|---|---|---|---|
| 5,352,059 | A * | 10/1994 | Ueno ..................... | B60G 7/001 280/124.152 |
| 2002/0089469 | A1* | 7/2002 | Cone .................. | G02B 27/0176 345/8 |
| 2002/0149545 | A1* | 10/2002 | Hanayama .......... | G02B 27/017 345/7 |
| 2003/0060226 | A1* | 3/2003 | Abood ................ | H04M 1/0212 455/550.1 |

(Continued)

FOREIGN PATENT DOCUMENTS

KR 10-2006-0132384 12/2006

OTHER PUBLICATIONS

PCT International Application No. PCT/KR2015/005578, Written Opinion of the International Searching Authority dated Sep. 11, 2015, 12 pages.

*Primary Examiner* — Kent Chang
*Assistant Examiner* — William Lu
(74) *Attorney, Agent, or Firm* — Lee, Hong, Degerman, Kang & Waimey PC

(57) ABSTRACT

A glasses-type mobile terminal includes a frame, a fixing body, a moving body and a joint. The frame is wearable on a user's head. The fixing body is coupled to one side of the frame. The moving body has a display unit for providing a user with visual information, and is disposed at the front based on user's eyes. The joint has one end coupled to the fixing body and the other end tiltably connected to the moving body so that the position of the moving body is controlled.

18 Claims, 9 Drawing Sheets

(56) References Cited

U.S. PATENT DOCUMENTS

| | | | |
|---|---|---|---|
| 2003/0184868 A1* | 10/2003 | Geist | G02B 27/0176 359/630 |
| 2004/0072621 A1* | 4/2004 | Mondry | F16D 3/33 464/118 |
| 2005/0191120 A1* | 9/2005 | Oellers | F16C 11/0652 403/133 |
| 2005/0219152 A1 | 10/2005 | Budd et al. | |
| 2005/0231599 A1* | 10/2005 | Yamasaki | G02B 3/14 348/207.99 |
| 2006/0119539 A1* | 6/2006 | Kato | G02B 27/0176 345/8 |
| 2006/0132382 A1* | 6/2006 | Jannard | G02C 11/06 345/8 |
| 2008/0170028 A1* | 7/2008 | Yoshida | G09G 3/2085 345/100 |
| 2008/0291277 A1* | 11/2008 | Jacobsen | G02B 27/0172 348/158 |
| 2010/0110368 A1 | 5/2010 | Chaum | |
| 2010/0188314 A1 | 7/2010 | Miyake et al. | |
| 2011/0043436 A1* | 2/2011 | Yamamoto | G02B 27/0172 345/8 |
| 2011/0221157 A1* | 9/2011 | Gerrard | B60G 3/20 280/124.135 |
| 2011/0248905 A1* | 10/2011 | Chosokabe | G02B 27/017 345/7 |
| 2012/0069448 A1* | 3/2012 | Sugihara | G02B 27/0176 359/643 |
| 2012/0081658 A1* | 4/2012 | Sugihara | G02B 27/0176 351/158 |
| 2013/0188080 A1 | 7/2013 | Olsson et al. | |
| 2015/0102982 A1* | 4/2015 | Kinno | G02B 27/0176 345/8 |

\* cited by examiner

GLASSES-TYPE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2014-0081166, filed on Jun. 30, 2014, the contents of which are incorporated by reference herein in its entirety.

BACKGROUND OF THE INVENTION

1. Field of the Invention

The present disclosure relates to a glasses-type mobile terminal configured to be wearable on a user's head, such as glasses.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A recent mobile terminal is configured as a wearable device that is wearable on a human body, beyond the conventional technique of a user grasping the mobile terminal using his or her hand. An example of such wearable device is a glass-type terminal wearing on a user's head, or a watch-type terminal wearing on a user's wrist.

Examples of the wearable device are a glasses-type mobile terminal worn on a user's head, a watch type mobile terminal worn around a user's wrist, and the like.

Among these wearable devices, the glasses-type mobile terminal is configured to be wearable on a user's head, such as glasses. If the user wear the glasses-type mobile terminal, a display unit is fixed at a position close to a user's eye, and thus the user can obtain visual information output from the display unit while watching the display unit.

However, the glasses-type mobile terminal configured as described above may cause several discomforts to the user.

First, the display unit disposed closely to the user's eye covers the user's visual field. Therefore, the user feels difficulty in securing the visual field in a state in which the user wears the glasses-type mobile terminal. Generally, a person feels perspective when an object is viewed with both the left and right eyes of the person. Therefore, if the display unit covers one of the user's eyes, the user may lose perspective.

Next, if the display unit is disposed at a position out of the user's visual field in order to secure the user's visual field, the user should watch a position out of the front in order to watch the display unit. Therefore, when the user watches the display unit for a long time of period, the fatigue of the user's eyes considerably increases.

Finally, since body sizes of people are different from one another, it may be inconvenient, depending on a person, to watch the display unit disposed at a fixed position.

Accordingly, it is necessary to propose a mobile terminal having a new structure, which can overcome problems of the conventional glasses-type mobile terminal.

SUMMARY OF THE INVENTION

Therefore, an aspect of the detailed description is to provide a glasses-type mobile terminal having a different structure from the conventional glasses-type mobile terminal.

Another aspect of the detailed description is to provide a glasses-type mobile terminal in which the position of a display unit can be controlled.

To achieve these and other advantages and in accordance with the purpose of this specification, as embodied and broadly described herein, a glasses-type mobile terminal includes: a frame configured to be wearable on a user's head; a fixing body coupled to one side of the frame; a moving body configured to have a display unit for providing a user with visual information, the moving body being disposed at the front based on user's eyes; and a joint configured to have one end coupled to the fixing body and the other end tiltably connected to the moving body so that the position of the moving body is controlled.

In one exemplary embodiment, the joint may include a rounded part accommodated in the moving body; an extending part formed to have a thickness thinner than that of the rounded part, the extending part being extended toward the fixing body from the rounded part; and a coupling part formed at an end portion of the extending part to be coupled to the fixing body.

In one exemplary embodiment, the moving body may include a front frame configured to have a protruding part formed opposite to the rounded part, the front frame supporting components inside the moving body; and a housing configured to have a portion coupled to the protruding part and another portion formed to surround the rounded part.

In one exemplary embodiment, the housing may have a trace forming part for setting a tiltable range of the moving body on the circumference of a portion surrounding the joint. The trace forming part may limit inclination of the joint at a predetermined position to set the tiltable range of the moving body.

In one exemplary embodiment, the trace forming part may be formed by partially cutting the portion surrounding the joint.

In one exemplary embodiment, the trace forming part may include a first trace part configured to form a tilting trace of the moving body in a first direction; and a second trace part configured to a tilting trace of the moving body in a second direction intersecting the first direction.

In one exemplary embodiment, the trace forming part may further include a third trace part formed between the first and second trace parts. The third trace part may form a tilting trace in a direction where the moving body is diagonally distant from the user's eyes through a combination of the first and second directions.

In one exemplary embodiment, the moving body may further include first and second guide bushes disposed between the housing and the joint, the first and second guide bushes being formed to surround different portions of the rounded part; and a plurality of elastic springs respectively disposed between the front frame and the first guide bush and between the front frame and the second guide bush to provide the first and second guide bushes with an elastic force for pressing the joint. The first and second guide bushes may transmit, to the joint, torque formed by the elastic force.

In one exemplary embodiment, the front frame may have a plurality of mounting grooves formed to allow the elastic springs on the outer circumferential surface of the protruding part. The housing may surround the outer circumferential surface of the protruding part to prevent the elastic spring from being separated from the mounting groove.

In one exemplary embodiment, at least one of the first and second guide bushes and the housing may be configured to expose at least a portion of the rounded part. The mobile terminal may further include a stopper configured to prevent in-situ rotation of the joint. The stopper may include a screw bush coupled to the exposed portion of the rounded part, the screw bush being blocked by the housing to limit the in-situ rotation of the joint when the joint moves in the in-situ rotation direction; and a stopper screw configured to have at least a portion fastened to the rounded part by passing through the screw bush so that the screw bush is fixed to the rounded part.

In one exemplary embodiment, the trace forming part and the stopper may be combined with each other to form the tilting trace of the moving body, thereby limiting the inclination of the joint.

In one exemplary embodiment, the moving body may be coupled to the joint and have a front frame for supporting components inside the moving body. The display unit may be mounted in the front frame and disposed opposite to the user's eyes at one or more positions.

In one exemplary embodiment, the moving body may have a camera installed in the front frame, the camera photographing an area in a direction opposite to that in which the display unit faces.

In one exemplary embodiment, the fixing body may be coupled to the frame to be slidingly movable.

In one exemplary embodiment, the mobile terminal may further include a printed circuit board installed in the frame or the fixing body; and a conductive connection part configured to consecutively pass through the insides of the fixing body, the joint and the moving body so that the display unit and the printed circuit board are electrically connected to each other.

In one exemplary embodiment, the fixing body, the joint and the moving body may respectively have hollow parts consecutively continued to allow the conductive connection part to pass therethrough.

In one exemplary embodiment, the fixing body may include a side frame configured to support components inside the fixing body, the side frame being connected to each of the frame and the joint; and a user input unit installed in the side frame, the user input unit having at least a portion exposed to the outside of the fixing body to receive a user's input.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., a smart watch, a smart glass, a head mounted display (HMD)), etc.

However, it will be obvious to those skilled in the art that the present invention may be also applicable to a fixed terminal such as a digital TV, a desktop computer and a digital signage, except for specific configurations for mobility.

Figure 1:
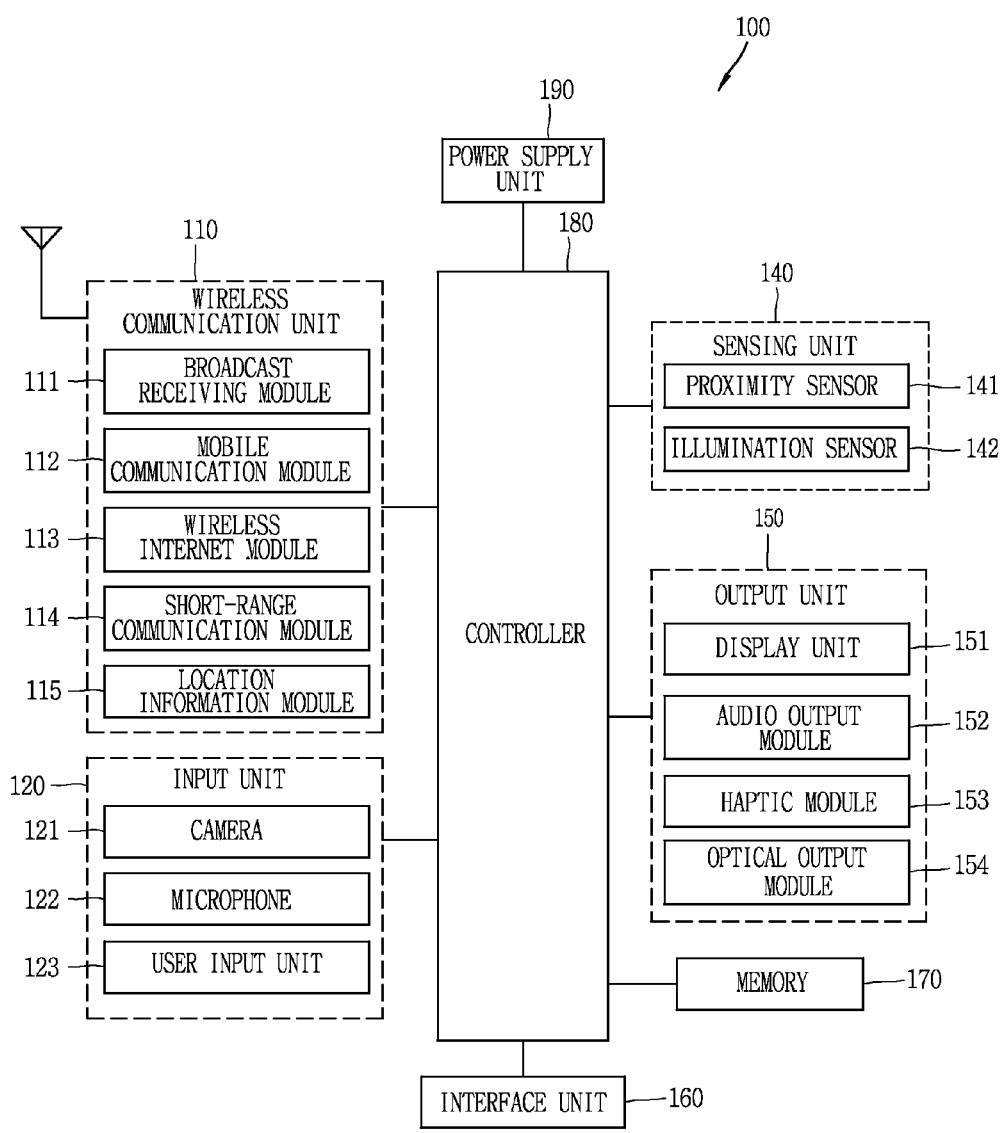
FIG. 1 is a block diagram illustrating a mobile terminal according to an exemplary embodiment.

FIG. 1 is a block diagram of a glasses-type terminal 100 according to an embodiment of the present invention.

The glasses-type terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the glasses-type terminal 100 and a wireless communication system, communications between the glasses-type terminal 100 and another mobile terminal, communications between the glasses-type terminal 100 and an external server. Further, the wireless communication unit 110 typically includes one or more modules which connect the glasses-type terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The glasses-type terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the glasses-type terminal 100 and a user, as well as function as the user input unit 123 which provides an input interface between the glasses-type terminal 100 and the user.

The interface unit 160 serves as an interface with various types of external devices that can be coupled to the glasses-type terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the glasses-type terminal 100 may perform assorted control functions associated with a connected external device, in response to the external device being connected to the interface unit 160.

The memory 170 is typically implemented to store data to support various functions or features of the glasses-type terminal 100. For instance, the memory 170 may be configured to store application programs executed in the glasses-type terminal 100, data or instructions for operations of the glasses-type terminal 100, and the like. Some of these application programs may be downloaded from an external server via wireless communication. Other application programs may be installed within the glasses-type terminal 100 at time of manufacturing or shipping, which is typically the case for basic functions of the glasses-type terminal 100 (for example, receiving a call, placing a call, receiving a message, sending a message, and the like). It is common for application programs to be stored in the memory 170, installed in the glasses-type terminal 100, and executed by the controller 180 to perform an operation (or function) for the glasses-type terminal 100.

The controller 180 typically functions to control overall operation of the glasses-type terminal 100, in addition to the operations associated with the application programs. The controller 180 may provide or process information or functions appropriate for a user by processing signals, data, information and the like, which are input or output by the various components, or activating application programs stored in the memory 170.

As one example, the controller 180 controls some or all of the components so as to drive application programs that have been stored in the memory 170. For driving of the application programs, the controller 180 may operate at least two of the components included in the glasses-type terminal 100, through a combination.

The power supply unit 190 can be configured to receive external power or provide internal power in order to supply appropriate power required for operating elements and components included in the glasses-type terminal 100. The power supply unit 190 includes a battery, and the battery is configured to be built-in (mountable) or chargeable.

At least some of the components may operate in cooperation with one another in order to implement an operation, control or control method of the mobile terminal according to various exemplary embodiments to be described below. The operation, control or control method of the mobile terminal may be implemented on the mobile terminal by the execution of at least one application program stored in the memory 170.

Hereinafter, the structure of the present disclosure will be described.

Figure 2:
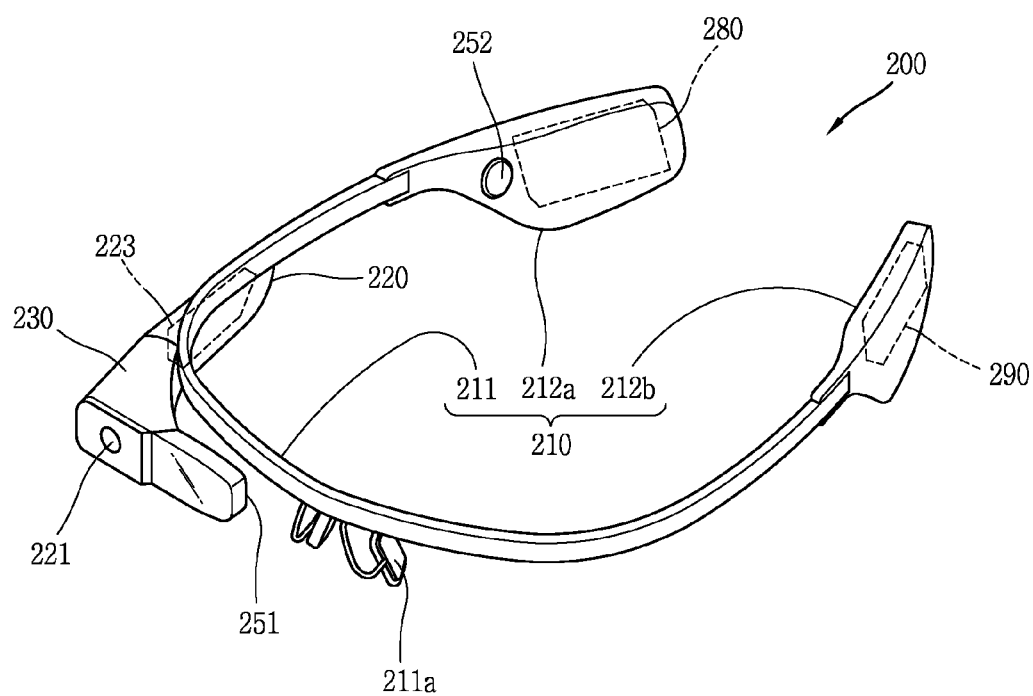
FIG. 2 is a perspective view illustrating a glasses-type mobile terminal according to an exemplary embodiment.

FIG. 2 is a perspective view illustrating a glasses-type mobile terminal 200 according to an exemplary embodiment.

The glasses-type mobile terminal 200 is configured to be wearable on a user's head. To this end, the glasses-type mobile terminal 200 may have a frame (or a frame part) 210. In the present disclosure, the external appearance of the glasses-type mobile terminal 200 may be formed by the frame 210, a fixing body 220 and a moving body 230.

The frame 210 is configured to be wearable on the user's head. The frame 210 functions as if it was the rim of glasses. At least a portion of the frame 210 may be formed of a flexible material so that the frame 210 can be easily worn on the user's head. The frame 210 may be configured with first and second frames made of different materials from each other. The glasses-type mobile terminal 200 may generally include characteristics of the mobile terminal 100 described in FIG. 1 or characteristics similar to those of the mobile terminal 100. The frame 210 is supported by the user's head, and provides a mounting space for various types of components. Electronic components such as a control module 280 and a sound output module 252 may be mounted in the frame 210.

The frame 210 may include a main frame 211 and sub-frames 212.

The main frame 211 is formed to surround a front portion of the user's head. Nose pads 211a are mounted at the main frame 211. If the user wears the glasses-type mobile terminal 200 on the user's head, the nose pads 211a are naturally mounted on a user's nose.

The sub-frames 212 are respectively connected to both end portions of the main frame 211. The sub-frames 212 may be formed to hang on user's ears, respectively. The sub-frames 212 may have the control module 280 and a power supply unit 290. In order to maintain weight balance of the glasses-type mobile terminal 200, any one 212b of the two sub-frames 212 may have the control module 280, and the other 212a of the two sub-frames 212 may have the power supply unit 290. In the two sub-frames 212, the sub-frame 212a having the power supply unit 290 may be mounted to be attachable/detachable to/from the main frame 211.

The control module 280 is configured to control various types of electronic components provided in the glasses-type mobile terminal 200. The control module 280 may be understood as a component corresponding to the controller 180 (see FIG. 1) described above. In this figure, it is illustrated that the control module 280 is installed in any one 212a of the sub-frames 212. However, the position of the control module 280 is not limited thereto.

The sound output module 252 for outputting a sound may be provided in the frame 210. The sound output module 252 may be implemented to transmit a sound in a general sound output manner or a bone conduction manner. In a case where the sound output module 252 is implemented in the bone conduction manner, the sound output module 252 is adhered closely to the user's head when the user wears the glasses-type mobile terminal 200, a voice is transmitted by vibrating a user's skull.

The fixing body 220 is coupled to one side of the frame 210. The fixing body 220 may be fixed to the frame 210, but the present disclosure is not necessarily limited thereto. For example, the fixing body 220 may be coupled to the frame 210 to be slidingly movable. If the fixing body 220 is coupled to the frame 210 to be slidingly movable, the user may control the position of the fixing body 220 by slidingly moving the fixing body 220.

The fixing body 220 may be disposed adjacent to a user's ear. For example, based on the user's ear, the fixing body 220 may be disposed prior to the user's ear, and the sub-frame 212 may be disposed posterior to the user's ear.

The fixing body 220 may have a user input unit 223.

The user input unit 223 is configured so that at least a portion of the user input unit 223 is exposed to the outside of the fixing body 220 to receive a user's input. Any manner may be employed in the user input unit 223 as long as it is a tactile manner in which the user performs a manipulation while having a tactile feeling, such as a touch or push. In this figure, it is illustrated that when the user wears the glasses-type mobile terminal 200, the user input unit 223 is disposed in an area between the user's eye and ear. The user may control the glasses-type mobile terminal 200 by applying a touch or push input to the user input unit 223.

The moving body 230 is disposed at the front based on the user's visual field. The moving body 230 is connected to the fixing body 220. The moving body 230 is tiltably formed. The connection structure of the fixing body 220 and the moving body 230 will be described later with reference to other drawings.

The moving body 230 has a display unit (or a display) 251 that covers at least one of the user's left and right eyes.

The display unit 251 is configured to provide the user with visual information. The display unit 251 may be implemented in the form of a head mounted display (HMD). The form of the HMD refers to a display manner in which the HMD is mounted at the user's head, to directly display an image in front of the user's eyes. The display unit 251 may be disposed corresponding to at least one of the user's left and right eyes, so that when the user wears the glasses-type mobile terminal 200, an image can be directly displayed in front of the user's eyes. In this figure, it is illustrated that the display unit 251 is positioned at a portion corresponding to the user's right eye, to output an image toward the user's right eye.

The display unit 251 may project an image onto the user's eyes using a prism. The prism may be formed transparent, so that the user can simultaneously view the projected image and a general front visual field (a range where the user views through the user's eyes).

As such, the image output through the display unit 251 may be viewed to overlap with the general visual field. The glasses-type terminal 200 may provide an augmented reality (AR) where a virtual image is overlapped with an actual image or background, thereby displaying the overlapped images as one image, using the display characteristic.

The moving body 230 may have a camera 221.

The camera 221 is configured to photograph an area in a direction opposite to that in which the display unit 251 faces. The display unit 251 outputs an image toward the user's eyes, and the camera 221 may photograph the front based on the user's visual field. The camera 221 is positioned adjacent to the user's eyes, and thus can obtain, as an image, a scene viewed by the user.

In this figure, it is illustrated that the camera 221 is provided in the moving body 220, but the present disclosure is not necessarily limited thereto. The camera 221 may be installed in the frame 210. Alternatively, the camera 221 may be configured with a plurality of cameras to obtain a stereoscopic image.

A microphone (not shown) may also be provided in the glasses-type mobile terminal 200. The microphone receives a sound to process the received sound as electrical sound data. When two microphones are installed in the glasses-type mobile terminal 200, an algorithm for removing noise may be applied.

Hereinafter, internal structures of the fixing body 220 and the moving body 230 will be described.

Figure 3:
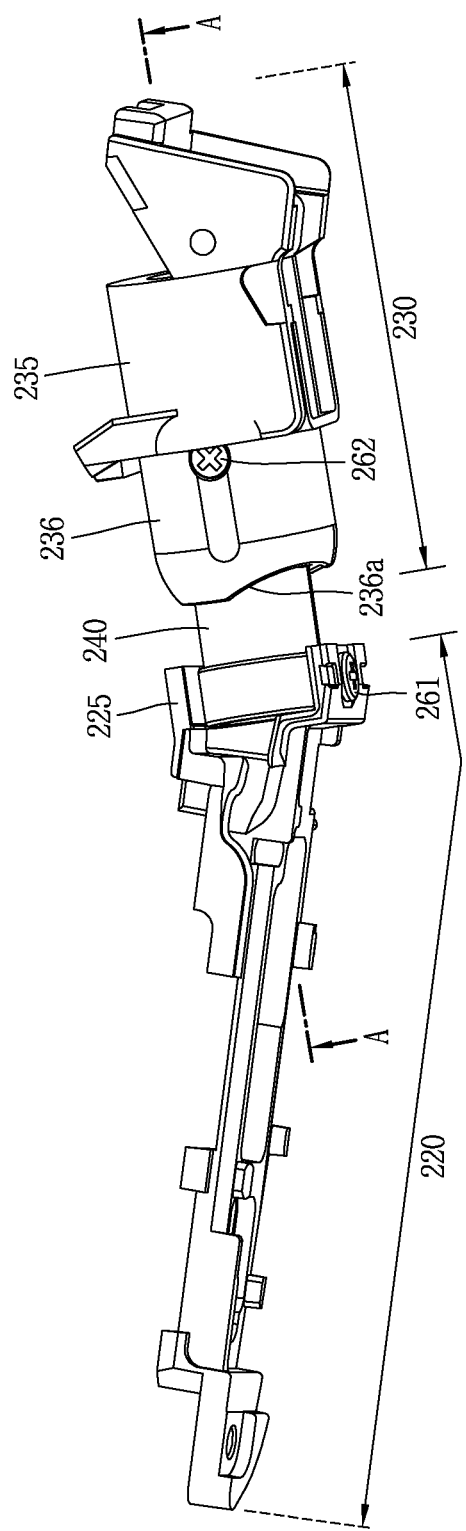
FIG. 3 is a conceptual view illustrating internal structures of a fixing body, a moving body and a joint.

FIG. 3 is a conceptual view illustrating internal structures of the fixing body 220, the moving body 230 and a joint (or a joint part) 240.

The fixing body 220 includes a side frame 225, and the side frame 225 is configured to support various types of components inside the fixing body 220. For example, the user input unit 223 described in FIG. 2 may be installed in the side frame 225. The user input unit 223 may be supported by the side frame 225.

The moving body 230 includes a front frame 235, and the front frame 235 is configured to support various types of components inside the moving body 230. For example, the display unit 251 and the camera 221 may be installed in the front frame 235. The display unit 251 and the camera 221 may be supported by the front frame 235.

The fixing body 220 and the moving body 230 are connected by the joint 240. One end (or a first end) of the joint 240 is coupled to the fixing body 220 by a screw 261. At least a portion of the side frame 225 is formed to accommodate the one end of the joint 240, and the one end (or a second end) of the joint 240 may be inserted into the side frame 225. If the screw 261 is fastened to the joint 240 by passing through the side frame 225, the side frame 225 and the joint 240 are coupled to each other.

The other end of the joint 240 is tiltably connected to the moving body 230 so that the position of the moving body 230 can be controlled. The moving body 230 includes a housing 236 coupled to the front frame 235 by a screw 262. The other end of the joint 240 is inserted into the housing 236, and is not fastened to the housing 236 through a screw. Accordingly, the other end of the joint 240 may be tiltably implemented in a state in which the other end of the joint 240 is inserted into the moving body 230.

The housing 236 has a trace forming part 236a for setting a tiltable range (or a rotational range) of the moving body 230, formed on the circumference of a portion surrounding the joint 240. The trace forming part 236a limits inclination of the joint 240 at a predetermined position to limit the tilting trace of the moving body 230. The trace forming part 236a may be formed by partially cutting the portion surrounding the joint 240, and the shape of the trace forming part 236a may be changed depending on a trace of the moving body 230, which is to be implemented.

The fixing body 220 and the joint 240 maintain a fixed state. Therefore, if an external force is applied to the moving body 230, the moving body 230 is tilted with respect to the joint 240. The tilting is a relative concept, and therefore, it may be understood that the joint 240 is tilted with respect to the moving body 230.

Hereinafter, the internal structures of the fixing body 220, the moving body 230 and the joint 240 will be described in detail.

Figure 4:
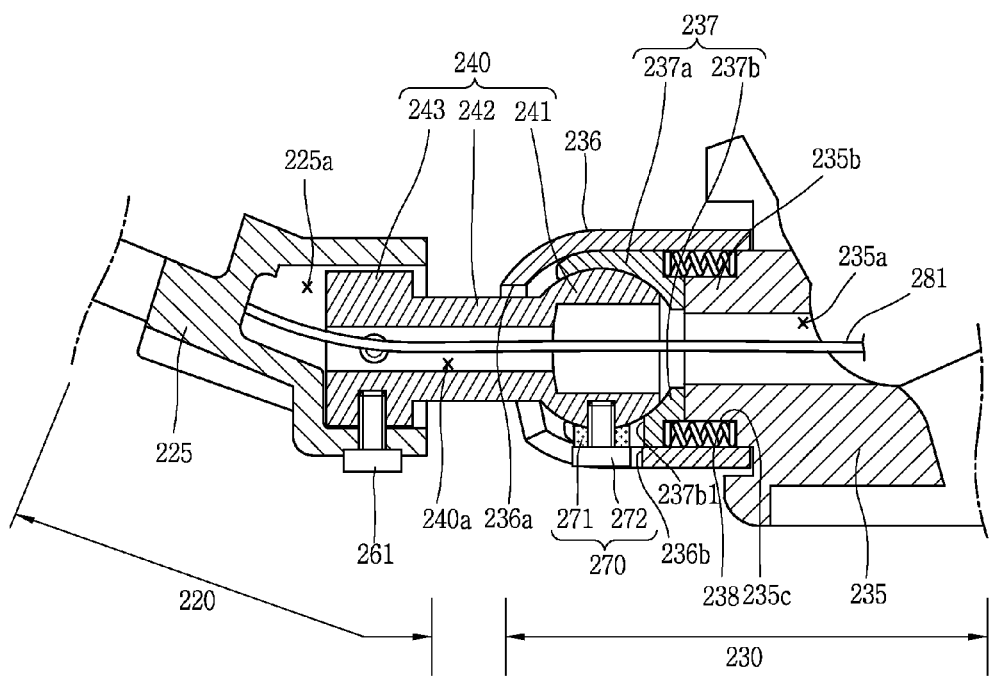
FIG. 4 is a sectional view taken along line A-A in FIG. 3.

FIG. 4 is a sectional view taken along line A-A in FIG. 3.

The side frame 225 is formed to surround the joint 240. At least a portion of the joint 240 is inserted into the side frame 225, and the joint 240 is coupled to the side frame 225 by the screw 261. The side frame 225 and the joint 240 maintain a state in which the side frame 225 and the joint 240 are fixed to each other.

The joint 240 is disposed between the fixing body 220 and the moving body 230, and connects the fixing body 220 and the moving body 230. The joint 240 includes a rounded part 241, an extending part 242 and a coupling part 243. The rounded part 241, the extending part 242 and the coupling part 243 may be integrally formed.

The rounded part 241 is accommodated in the moving body 230. The rounded part 241 is merely inserted into the moving body 230, and is not fastened to the moving body 230 by a screw. The moving body 230 is formed to surround the rounded part 241. Thus, the joint 240 may be maintained in the state in which the joint 240 is inserted into the moving body 230 without being arbitrarily separated from the moving body 230.

The extending part 242 is formed to have a thickness thinner than that of the rounded part 241. The extending part 242 is extended toward the fixing body 220 from the rounded part 241. The joint 240 may be tiltably implemented by the form of the rounded part 241 and the extending part 242.

The coupling part 243 is formed at an end portion of the extending part 242. The coupling part 243 is coupled to the fixing body 220. The coupling part 243 may be formed to have a thickness thicker than that of the extending part 242. The one end of the joint 240 described above corresponds to the coupling part 243, and the other end of the joint 240 corresponds to the rounded part 241.

The moving body 230 includes the front frame 235, the housing 236, a guide bush 237 and elastic springs 238.

The front frame 235 has a protruding part 235b formed opposite to the rounded part 241. The protruding part 235b is formed not to interfere with movement of the rounded part 241. The protruding part 235b may be integrally formed with the front frame 235, but the present disclosure is not necessarily limited thereto. For example, a component having the protruding part 235b may be coupled to the front frame 235.

A portion of the housing 236 is coupled to the protruding part 235b, and another portion of the housing 236 is formed to surround the rounded part 241. Alternatively, a portion of the housing 236 may be formed to surround the protruding part 235b, and may be coupled to the protruding part 235b by a screw (not shown). Another portion of the housing is not directly coupled to the rounded part 241. Therefore, the joint 240 may be tilted.

The guide bush 237 includes a first guide bush 237a and a second guide bush 237b. The first and second guide bushes 237a and 237b are disposed between the housing 236 and the rounded part 241. The first and second guide bushes 237a and 237b are formed to surround different portions of the rounded part 241. As an example, it may be understood that if the first guide bush 237a is formed to surround an upper portion of the rounded part 241, the second guide bush 237b is formed to surround a lower portion of the rounded part 241. As another example, it may be understood that if the first guide bush 237a is formed to surround a right portion of the rounded part 241, the second guide bush 237b is formed to surround a left portion of the rounded part 241. Accordingly, the first and second guide bushes 237a and 237b are formed to surround the rounded part 241, and the housing 236 is formed to surround the first and second guide bushes 237a and 237b.

The rounded part 241 is disposed in a space formed by the housing 236 and the guide bush 237, and the extending part 242 is extended through an opened area of the housing 236 and the guide bush 237. The opened area of the housing 23 and the guide bush 237 is formed to be smaller than the rounded part 241 and greater than the extending part 242. Thus, the joint 240 can be tilted while not being arbitrarily separated from the moving body 230.

The elastic springs 238 provide the first and second guide bushes 237a and 237b with an elastic force for pressing the joint 240. To this end, a plurality of elastic springs 238 are disposed between the front frame 235 and the first guide bush 237a. A plurality of elastic springs 238 are also disposed between the front frame 235 and the second guide bush 237b.

The front frame 235 has a mounting groove 235c formed in the outer circumferential surface of the protruding part 235b. The mounting groove 235c is formed to allow the elastic spring 238 to be mounted therein. The housing 236 surrounds the circumference of the protruding part 235b to prevent the elastic spring 238 from being separated from the mounting groove 235c.

The elastic spring 238 provides an elastic force, and the first and second guide bushes 237a and 237b transmits, to the joint 240, torque formed by the elastic force. Thus, if the elastic force of the elastic spring 238 is controlled, the torque can be controlled.

According to the configuration described above, in the present disclosure, it is possible not only to implement a simple tilt of the moving body 230 but also to implement a soft tilt of the moving body 230. In addition, it is possible not only to tilt the moving body 230 by applying a relatively weak force but also to fix the position of the tilted moving body 230.

A printed circuit board may be installed in the frame 210 or the fixing body 220 described in FIG. 2. The printed circuit board may be understood as the control module 280. The glasses-type mobile terminal 200 includes a conductive connection part 281 that consecutively passes through the insides of the fixing body 220, the joint 240 and the moving body 230 so that the display unit 251 and the printed circuit board are electrically connected to each other. The conductive connection part 281 includes at least one of a flexible printed circuit board (FPCB) and a cable.

The fixing body 220, the joint 240 and the moving body 230 may respectively have hollow parts 225a, 240a and 235a consecutively continued to allow the conductive connection part 281 to pass therethrough. The printed circuit board and the display unit 251 may be electrically connected by the conductive connection part 281 passing through the hollow parts 225a, 240a and 235a. In addition to the display unit 251, various types of electronic components installed in the moving body 230 may be electrically connected to the printed circuit board by the conductive connection part 281 passing through the hollow parts 225a, 240a and 235a.

If the joint 240 performs repetitive in-situ rotations about the extending axis of the extending part 242, the conductive connection part 281 passing through the hollow parts 225a, 240a and 235a may be disconnected while being continuously twisted. In order to prevent such a phenomenon, the glasses-type mobile terminal 200 includes a stopper 270 configured to prevent the in-situ rotation of the joint 240.

At least one of the first and second guide bushes 237a and 237b and the housing 236 are formed to expose at least a portion of the rounded part 241. The portions exposing the rounded part 241 in the housing 236 and the guide bush 237 may be referred to as exposing parts 236b and 237b1, respectively. The stopper 270 is coupled to a portion of the rounded part 241, which is exposed to the outside, to prevent the in-situ rotation of the joint 240. The stopper 270 includes a screw bush 271 and a stopper screw 272.

The screw bush 271 is coupled to the exposed portion of the rounded part 241. If the joint 240 moves in the in-situ rotation direction, the screw bush 271 is blocked by the housing 236 or the guide bush 237 to limit the in-situ rotation of the joint 240.

At least a portion of the stopper screw 272 is fastened to the rounded part 241 by passing through the screw bush 271 so that the screw bush 271 is fixed to the rounded part 241. A screw hole 241b (see FIG. 5) is formed in the rounded part 241, and the stopper screw 272 is fastened in the screw hole 241b.

The exposing parts 236b and 237b1 of the housing 236 and the guide bush 237 may be formed by cutting at least portions of the housing 236 and the guide bush 237, respectively. The stopper 270 may move along the cut areas. However, the stopper 270 cannot move to uncut areas. Thus, when the moving body 230 is tilted to an area except a predetermined tilting area or performs an in-situ rotation, the stopper 270 can limit inclination of the moving body 230.

Figure 5:
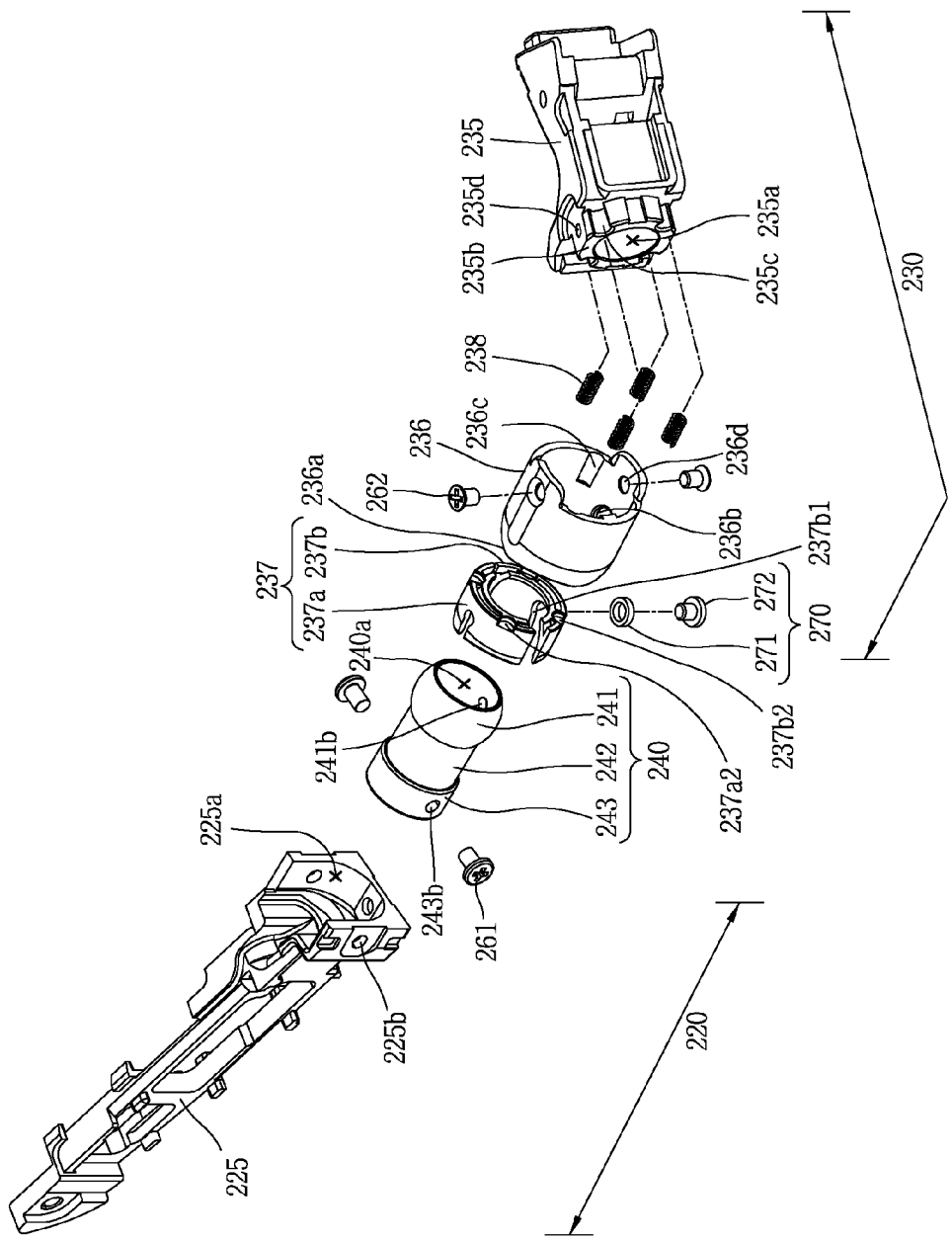
FIG. 5 is an exploded perspective view of the fixing body, the moving body and the joint.

FIG. 5 is an exploded perspective view of the fixing body 220, the moving body 230 and the joint 240.

Contents described in FIG. 5 are basically identical to those described in FIG. 4.

A hole 225b and a screw hole 243b, which correspond to each other, are formed in the side frame 225 and the joint 240, respectively. The screw 261 may be fastened in the screw hole 243b by passing through the hole 225b. Accordingly, the joint 240 can be fixed to the side frame 225.

The first and second guide bushes 237a and 237b are configured to surround the rounded part 241, and the housing 236 is configured to surround the first and second guide bushes 237a and 237b. Other mounting grooves 236c, 237a2 and 237b2 corresponding to the mounting groove 235c of the front frame are respectively formed in the housing 236, the first guide bush 237a and the second guide bush 237b. The mounting grooves 237a2 and 237b2 of the guide bush 237, the mounting groove 236c of the housing 236, and the mounting groove 235c of the front frame 235 are formed to correspond to each other, thereby forming arrangement spaces of the elastic springs 238. The elastic springs 238 are arranged in the spaces formed by the mounting grooves 235c, 236c, 237a2 and 237b2. The elastic springs 238 are pressed by the front frame 235 and the guide bush 237. Accordingly, the elastic springs 238 provide an elastic force to the guide bush 237.

A hole 236d and a screw hole 235d are respectively formed at portions corresponding to each other in the housing 236 and the front frame 235. The screw 262 is fastened in the screw hole 235d of the front frame 235 by passing through the hole 236d of the housing 236.

Any one of the first and second guide bushes 237a and 237b is formed to expose the rounded part 241, and the housing 236 is also formed to expose the rounded part 241. As shown in this figure, the second guide bush 237b is formed to expose the rounded part 241. As described above, the portions exposing the rounded part 241 in the housing 236 and the guide bush 237 may be referred to as the exposing parts 236b and 237b1, respectively. The tilt of the moving body 230 is determined by the tilting trace of the joint 240, and the rotation and tilt of the joint 240 are limited by the stopper 270. Thus, the portion exposing the rounded part 241 in the second guide bush 237b and the portion exposing the rounded part 241 in the housing 236 can form the tilting trace of the moving body 230.

The tilting trace of the moving body 230 will be described with reference to FIG. 6.

Figure 6:
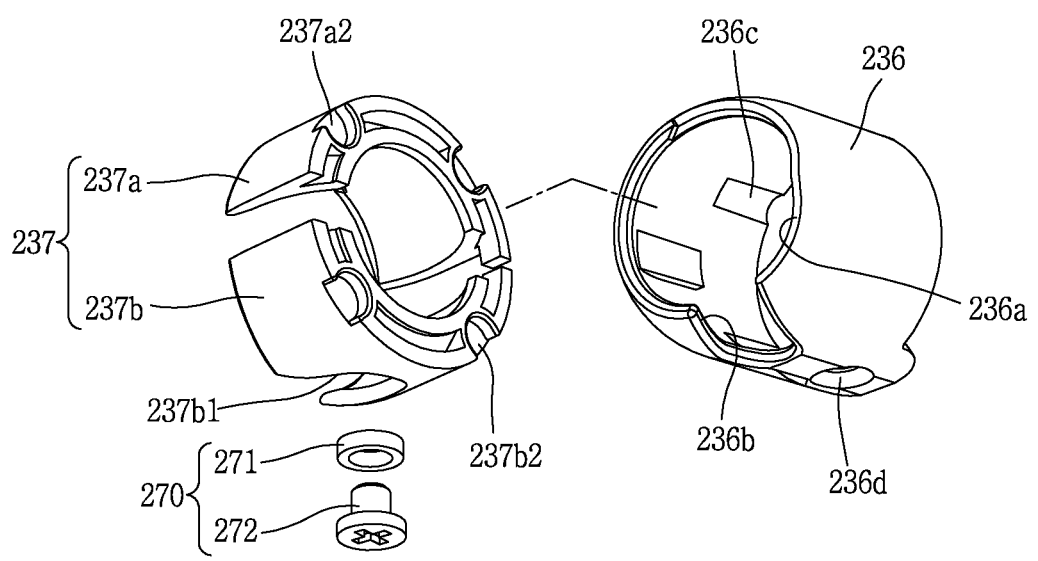
FIG. 6 is a conceptual view illustrating a housing and a guide bush, viewed from different directions.

FIG. 6 is a conceptual view illustrating the housing 236 and the guide bush 237, viewed from different directions.

The housing 236 has the trace forming part 236a for setting a tiltable range of the moving body 230, formed on the circumference of the portion surrounding the joint 240. The trace forming part 236a limits inclination of the joint 240 to limit the tilting trace of the moving body 230 within a predetermined area.

The trace forming part 236a may be formed by partially cutting the portion surrounding the joint 240, and the tilting trace of the moving body 230 may be changed depending on a shape of the trace forming part 236a. The trace forming part 236a may include a first trace part and a second trace part. The first trace part may form a tilting trace of the moving body 230 in a first direction, and the second trace part may form a tilting trace of the moving body 230 in a second direction. The first and second directions may intersect each other. The first and second directions may intersect perpendicular to each other.

For example, if the first trace part forms a tilting trace of the moving body 230 in the vertical direction, the second trace part may form a tilting trace of the moving body 230 in the horizontal direction. If the portion surrounding the joint 240 in the housing 236 is further cut in the vertical direction as compared with other portions, the joint 240 may be inclined in the vertical direction. If the portion surrounding the joint 240 in the housing 236 is further cut in the horizontal direction as compared with other portions, the joint 240 may be inclined in the horizontal direction. The inclination of the joint 240 is changed depending on a degree where the housing 236 is cut, and the tilting trace of the moving body 230 is changed as the inclination of the joint 240 is changed.

The trace forming part 236a may include a third trace part formed between the first and second trace parts. The third trace part may form a tilting trace of the moving body 230 in a direction where the moving body 230 is diagonally distant from the user's eyes through a combination of the first and second directions. According to the combination, the moving body 230 may be tilted in the diagonally distant direction as well as the vertical and horizontal directions.

The stopper 270 may not only prevent the in-situ rotation of the joint 230 but also set a tiltable range of the moving body 230. As the joint 240 is inclined, the stopper 270 rotates together with the rounded part 241. The stopper 270 is blocked by the housing 236 to limit the inclination of the joint 240, so that the inclination of the joint 240 can be limited in the rotatable direction of the stopper 270. Thus, the stopper 270 can be combined with the trace forming part 236a, thereby forming the tilting trace of the moving body 230.

Hereinafter, the glasses-type mobile terminal 200 according to the present disclosure will be described.

Figure 7A:
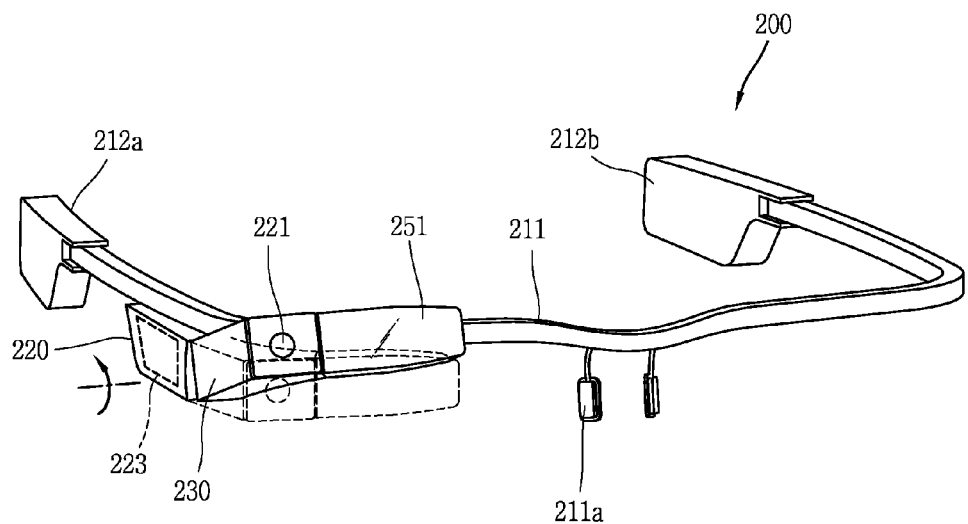
FIG. 7A is a conceptual view of the moving body tilted in a first direction.

FIG. 7A is a conceptual view of the moving body 230 tilted in a first direction.

In FIG. 7A, the first direction is a vertical direction. As the moving body 230 is tilted about the axis extended in the horizontal direction, the moving body 230 is tilted in the vertical direction. The tilting range of the moving body 230 about a user's eyeball may be set to +15 to −5 degrees (the positive number represents a direction facing upward from the drawing, and the negative number represents a direction facing downward from the drawing), but the present disclosure is not necessarily limited thereto.

The display unit 251 is disposed opposite to the user's eyes at one or more positions. However, as the moving body 230 is tilted, the display unit 251 is out of the user's eyes. As a result, the user can secure the visual field of an area covered by the display unit 251.

Figure 7B:
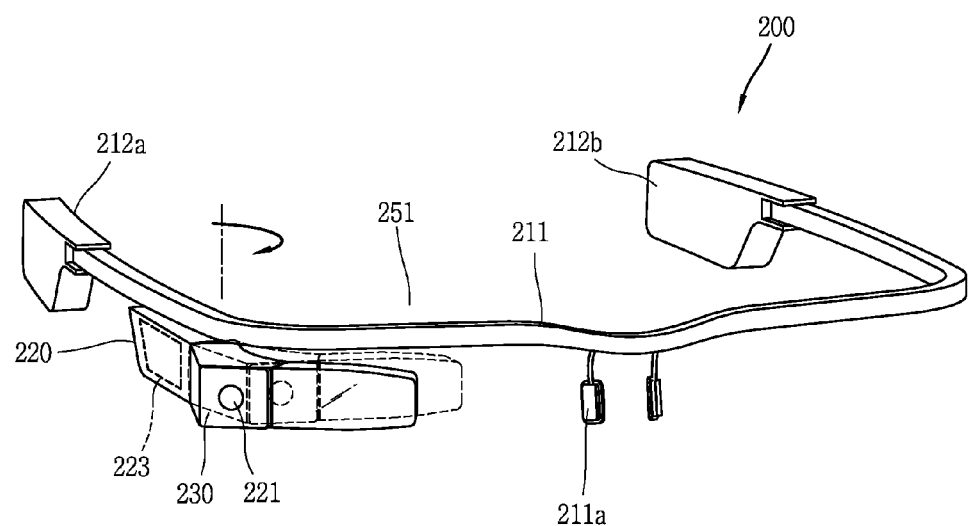
FIG. 7B is a conceptual view of the moving body tilted in a second direction.

FIG. 7B is a conceptual view of the moving body 230 tilted in a second direction.

In FIG. 7B, the second direction is a horizontal direction. As the moving body 230 is tilted about the axis extended in the vertical direction, the moving body 230 is tilted in the horizontal direction. The tilting range of the moving body 230 about the user's eyeball may be set to +20 to −5 degrees (the positive number represents a direction distant from the user's eyeball, and the negative number represents a direction close to the user's eyeball), but the present disclosure is not necessarily limited thereto.

The display unit 251 is disposed opposite to the user's eyes at one or more positions. However, as the moving body 230 is tilted, the display unit 251 is out of the user's eyes. As a result, the user can secure the visual field of an area covered by the display unit 251.

Figure 7C:
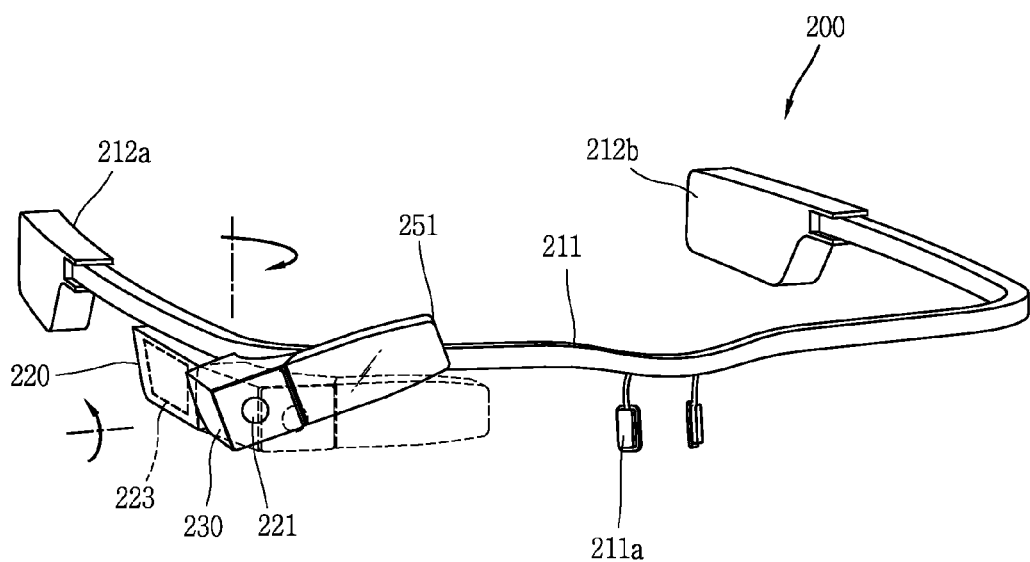
FIG. 7C is a conceptual view of the moving body tilted in a direction diagonally distant from user's eyes.

FIG. 7C is a conceptual view of the moving body 230 tilted in a direction diagonally distant from user's eyes.

In FIG. 7C, a third direction is the direction diagonally distant from the user's eyes. The third direction is formed by a combination of the first and second directions. As the moving body 230 is tilted, the moving body 230 is distant in the horizontal direction from the user's eyeball and simultaneously distant in the vertical direction from the user's eyeball. The tilting range of the moving body 230 may be set to +15 to −5 degrees (the positive number represents a direction facing upward from the drawing, and the negative number represents a direction facing downward from the drawing) with respect to the vertical direction and +20 to −5 degrees (the positive number represents a direction distant from the user's eyeball, and the negative number represents a direction close to the user's eyeball) with respect to the horizontal direction, but the present disclosure is not necessarily limited thereto.

Hereinafter, a process in which the glasses-type mobile terminal 200 according to the present disclosure is actually worn and used will be described.

Figure 8A:
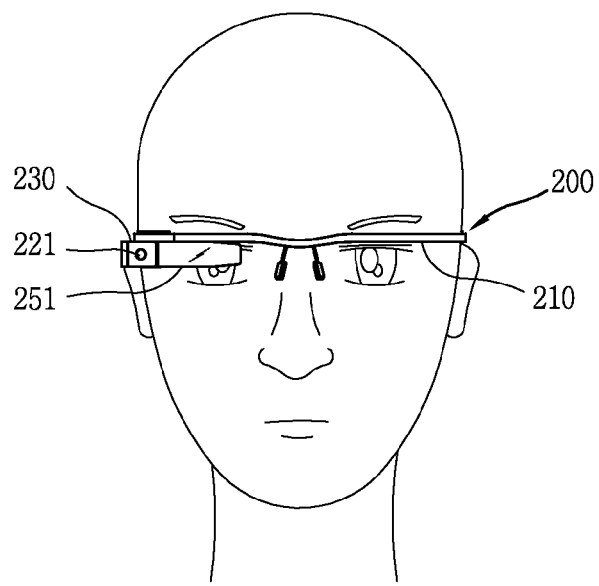
FIG. 8A is a view illustrating a state in which the glasses-type terminal is worn.

FIG. 8A is a view illustrating a state in which the glasses-type terminal 200 is worn.

The display unit 251 installed in the moving body 230 is disposed opposite to the user's eyes. The display unit 251 provides visual information toward the user's eyes. The user can obtain the visual information provided by the display unit 251. The display 251 is disposed not to be out of the user's visual field, and thus the user hardly feels tired in watching the display unit 251.

However, in the use state described above, there is an area covered by the display unit 251, and therefore, the user has difficulty in securing a front visual field.

Figure 8B:
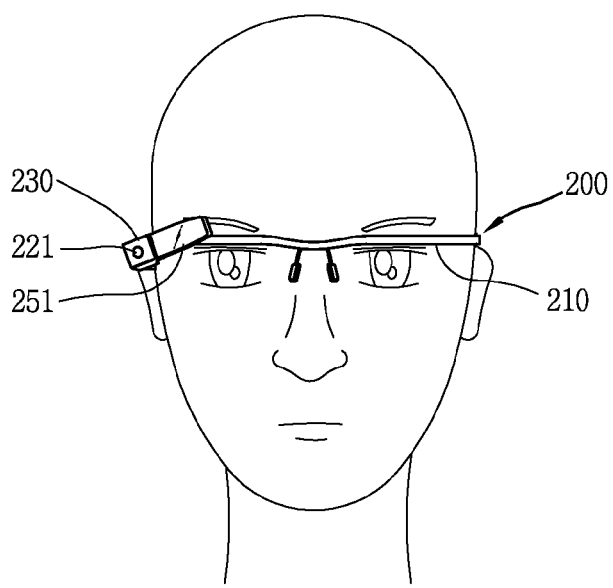
FIG. 8B is a view illustrating a state in which the user's visual field is secured by tilting the moving body.

FIG. 8B is a view illustrating a state in which the user's visual field is secured by tilting the moving body 230.

The user may tilt the moving body 230 so that the display unit 251 is out of the position at which the display unit 251 is opposite to the user's eyes. The moving body 230 may be tilted in a direction diagonally distant from the user's eyeball. Accordingly, the user can secure the visual field covered by the display unit 251.

As such, in the present disclosure, the position of the moving body 230 can be selectively controlled according to user's requirements. The display unit 251 may be disposed opposite to the user's eyes or distant from the user's eyes according to whether the display unit 251 is used.

Thus, when the display unit 251 is used, the user can dispose the display unit in front of the user's eyes by controlling the position of the moving body 230. Further, it is possible to control perspective by slidingly moving the fixing body 220.

On the contrary, when the display unit 251 is not used, the user can secure a visual field by controlling the position of the moving body 230.

The glasses-type mobile terminal described above is not limited to the configurations and methods of the above-described embodiments. These embodiments may be completely or partially selectively combined to implement various changes.

According to the present disclosure configured as described above, the position of the moving body can be controlled. When the display unit is used, the position of the moving body is controlled so that the display unit can be disposed opposite to the user's eyes. When the display unit is not used, the position of the moving body is controlled so that the display unit can be disposed at a position distant from the user's eyes. The user can secure a front visual field by controlling the position of the moving body.

Further, in the present disclosure, the moving body can be tilted along a predetermined tilting trace of the moving body. The tilting trace of the moving body may be set to a vertical direction, a horizontal direction or a diagonal direction through a combination of the vertical and horizontal directions.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A glasses-type mobile terminal, comprising:
    a frame shaped to be wearable on a user's head;
    a fixing body coupled to one side of the frame;
    a moving body;
    a display coupled to the moving body and configured to provide a user with visual information; and
    a joint comprising a first end and a second end, wherein the first end is coupled to the fixing body, and wherein the second end comprises a rounded part having a curved circumferential surface sized to be received within the moving body and is coupled to the moving body to permit relative rotational movement between the joint and the moving body,
    wherein the moving body comprises a housing configured to have a portion coupled to the protruding part and another portion formed to surround at least a portion of the rounded part,
    wherein the housing has a trace forming part for setting a rotational range of the moving body relative to the joint,
    wherein the trace forming part is formed as a cutout of a portion that surrounds the joint and limits inclination of the joint relative to the moving body at a predetermined position in order to set a tilting range of the moving body, and
    wherein the trace forming part comprises:
        a first trace part configured to form a tilting trace to permit positioning of the moving body relative to the joint in a first direction; and
        a second trace part configured to form a tilting trace to permit positioning of the moving body relative to the joint in a second direction intersecting the first direction.

2. The glasses-type mobile terminal of claim 1, wherein the joint further comprises:
    an extending part located between the first end and the second end of the joint; wherein
    the first end of the joint comprises a coupling part sized to be coupled to the fixing body;
    and wherein
    the extending part is formed to have a thickness that is less than that of the rounded part.

3. The glasses-type mobile terminal of claim 1, wherein the moving body comprises:
    a front frame configured to have a protruding part formed opposite to the rounded part, the front frame supporting components inside the moving body.

4. The glasses-type mobile terminal of claim 1, wherein the trace forming part further comprises a third trace part formed between the first and second trace parts; and
    wherein the third trace part forms a tilting trace in a direction where the moving body is diagonally distant from the user's eyes through a combination of the first and second directions.

5. The glasses-type mobile terminal of claim 1, wherein the moving body includes a front frame for supporting components inside the moving body; and
    wherein the display is mounted in the front frame and disposed opposite to the user's eyes at one or more positions.

6. The glasses-type mobile terminal of claim 5, wherein the moving body has a camera included in the front frame, the camera obtaining images of an area in a direction opposite to that in which the display faces.

7. The glasses-type mobile terminal of claim 5, wherein the fixing body is slidably coupled to the frame to permit relative sliding movement between the fixing body and the frame.

8. The glasses-type mobile terminal of claim 1, further comprising:
    a printed circuit board included in the frame or the fixing body; and
    a conductive connection part configured to consecutively pass through inner regions of the fixing body, the joint, and the moving body, to permit electrical coupling of the display and the printed circuit board.

9. The glasses-type mobile terminal of claim 8, wherein the fixing body, the joint, and the moving body, respectively include hollow regions to allow the conductive connection part to pass therethrough.

10. The glasses-type mobile terminal of claim 1, wherein the fixing body comprises:
    a side frame configured to support components inside the fixing body, the side frame being connected to each of the frame and the joint; and a user input unit included in the side frame, the user input unit having at least a portion exposed to an outside of the fixing body to receive a user input.

11. A glasses-type mobile terminal, comprising:
a wireless communication unit configured to wirelessly communicate with a network;
a memory;
a display;
a controller configured to operate according to instructions stored in the memory to facilitate the wireless communication with the network and to cause the display to display information;
a frame shaped to be wearable on a user's head;
a fixing body coupled to the frame;
a moving body, wherein the display is coupled to the moving body; and
a joint comprising a first end and a second end, wherein the first end is coupled to the fixing body, and
wherein the second end comprises a rounded part having a curved circumferential surface sized to be received within the moving body and is coupled to the moving body to permit relative rotational movement between the joint and the moving body,
wherein the moving body comprises a housing configured to have a portion coupled to the protruding part and another portion formed to surround at least a portion of the rounded part,
wherein the housing has a trace forming part for setting a rotational range of the moving body relative to the joint,
wherein the trace forming part is formed as a cutout of a portion that surrounds the joint and limits inclination of the joint relative to the moving body at a predetermined position in order to set a tilting range of the moving body, and
wherein the trace forming part comprises:
a first trace part configured to form a tilting trace to permit positioning of the moving body relative to the joint in a first direction; and
a second trace part configured to form a tilting trace to permit positioning of the moving body relative to the joint in a second direction intersecting the first direction.

12. The glasses-type mobile terminal of claim 11, wherein the wireless communication unit, the memory, and the display are included within the frame or the fixing body.

13. A glasses-type mobile terminal, comprising:
a frame shaped to be wearable on a user's head;
a fixing body coupled to one side of the frame;
a moving body;
a display coupled to the moving body and configured to provide a user with visual information; and
a joint comprising a first end and a second end, wherein the first end is coupled to the fixing body, and wherein the second end comprises a rounded part having a curved circumferential surface sized to be received within the moving body and is coupled to the moving body to permit relative rotational movement between the joint and the moving body,
wherein the moving body comprises:
a front frame configured to have a protruding part formed opposite to the rounded part, the front frame supporting components inside the moving body; and
a housing configured to have a portion coupled to the protruding part and another portion formed to surround at least a portion of the rounded part,
wherein the housing has a trace forming part for setting a rotational range of the moving body relative to the joint,
wherein the trace forming part limits inclination of the joint relative to the moving body at a predetermined position in order to set a tilting range of the moving body, and
wherein the moving body further comprises:
first and second guide bushes disposed between the housing and the joint, the first and second guide bushes being formed to surround different portions of the rounded part; and
a plurality of elastic springs respectively disposed between the front frame and the first guide bush and between the front frame and the second guide bush to provide the first and second guide bushes with an elastic force against the joint; and
wherein the first and second guide bushes provide, to the joint, torque formed by the elastic force.

14. The glasses-type mobile terminal of claim 13, wherein the front frame has a plurality of mounting grooves formed to allow the elastic springs on an outer circumferential surface of the protruding part; and
wherein the housing surrounds the outer circumferential surface of the protruding part to prevent the elastic springs from being separated from the mounting groove.

15. The glasses-type mobile terminal of claim 13, wherein at least one of the first guide bush, the second guide bush, or the housing, is configured to expose at least a portion of the rounded part;
wherein the mobile terminal further comprises a stopper configured to prevent in-situ rotation of the joint relative to the moving part; and
wherein the stopper comprises:
a screw bush coupled to the exposed portion of the rounded part, the screw bush being blocked by the housing to limit the in-situ rotation when the joint moves relative to the moving part in the in-situ rotation direction; and
a stopper screw configured to have at least a portion fastened to the rounded part by passing through the screw bush so that the screw bush is fixed to the rounded part.

16. The glasses-type mobile terminal of claim 15, wherein the trace forming part and the stopper are combined to form the tilting trace of the moving body, thereby limiting the inclination of the joint relative to the moving body.

17. The glasses-type mobile terminal of claim 13, wherein the joint further comprises:
an extending part located between the first end and the second end of the joint; wherein
the first end of the joint comprises a coupling part sized to be coupled to the fixing body; and wherein
the extending part is formed to have a thickness that is less than that of the rounded part.

18. The glasses-type mobile terminal of claim 13, wherein the trace forming part is formed as a cutout of a portion that surrounds the joint.

* * * * *